(No Model.)
J. TIMMS.
BRAKE WHEEL.
No. 534,353. Patented Feb. 19, 1895.
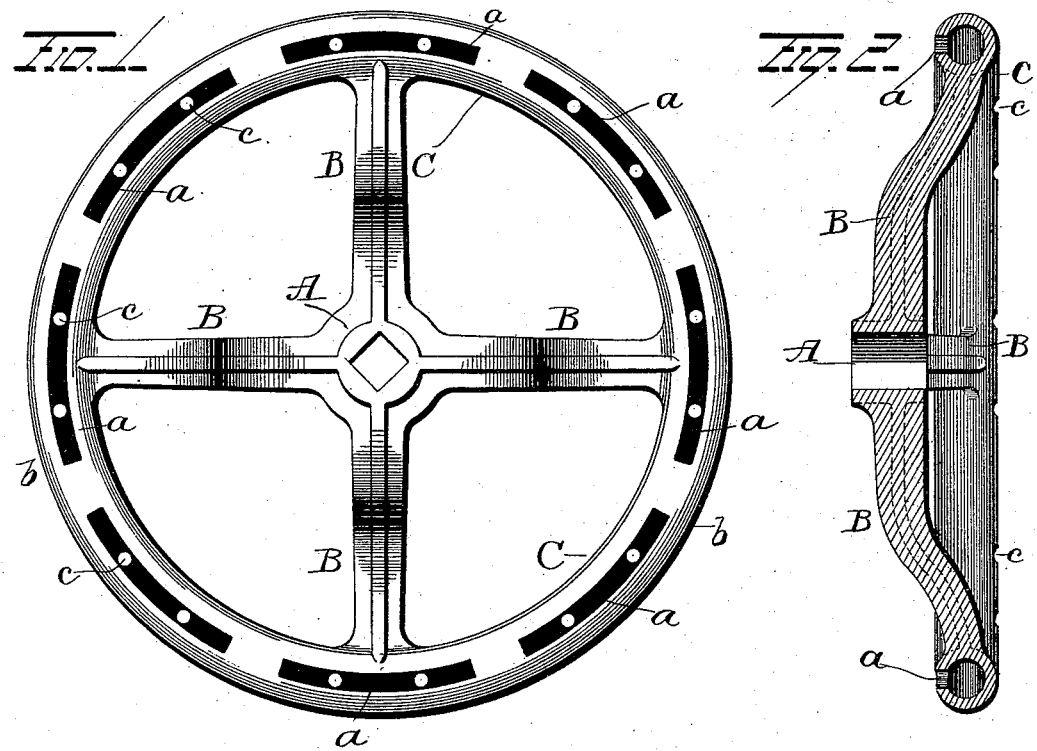
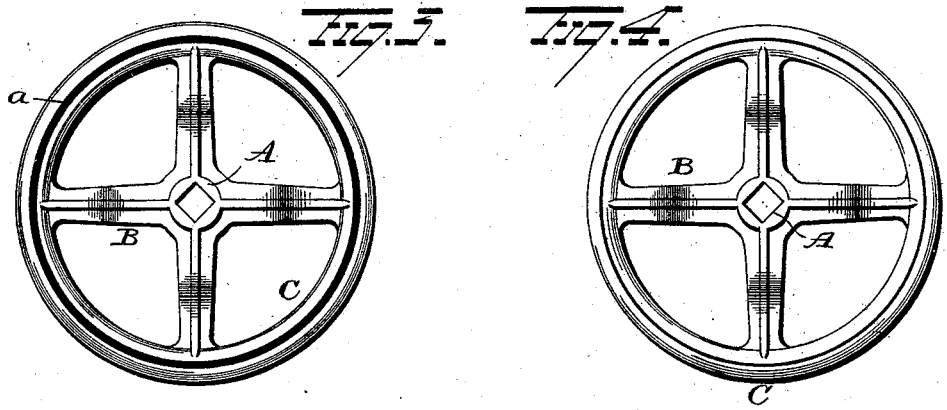
Witnesses
E. J. Nottingham
G. F. Downing
Inventor
James Timms
By H. A. Seymour
Attorney
THE NORRIS PETERS CO., PHOTO-LITHO., WASHINGTON, D. C.

UNITED STATES PATENT OFFICE.

JAMES TIMMS, OF COLUMBUS, OHIO, ASSIGNOR TO THE BUCKEYE MALLEABLE IRON AND COUPLER COMPANY, OF SAME PLACE.

BRAKE-WHEEL.

SPECIFICATION forming part of Letters Patent No. 534,353, dated February 19, 1895.

Application filed November 23, 1894. Serial No. 529,753. (No model.)

*To all whom it may concern:*

Be it known that I, JAMES TIMMS, a resident of Columbus, in the county of Franklin and State of Ohio, have invented a certain new and useful Improvement in Brake-Wheels; and I do hereby declare the following to be a full, clear, and exact description of the invention, such as will enable others skilled in the art to which it appertains to make and use the same.

My invention relates to an improvement in brake wheels.

Heretofore it has been proposed to produce a malleable iron brake wheel having a solid rim and spokes cast integral therewith. Such wheels have been found defective, owing to the separation of the spokes from the rim, due to contraction of said spokes, thus rendering the wheel ineffectual and useless. It has been sought to avoid this defect by making the rim hollow and providing it with a peripheral groove, but, in practice, this has failed to produce a wheel in which the spokes would not separate from the rim. In an effort to prevent the separation of the spokes from the rim of the wheel, it has also been proposed to cast a plate of steel between the spokes and the rim but this has failed to cure the defect.

So far as I am aware, all attempts heretofore made to successfully produce a cast brake wheel of malleable iron have failed and it is the object of my invention to produce a brake wheel which shall be so constructed that the separation of the spokes from the rim will be effectually prevented.

With this object in view the invention consists in a brake wheel comprising a hub, spokes and a hollow rim said rim being slotted at one side of its periphery.

The invention also consists in certain novel features of construction of a brake wheel which will be hereinafter set forth and pointed out in the claims.

In the accompanying drawings: Figure 1 is a view illustrating my improvements. Fig. 2 is a sectional view. Figs. 3 and 4 are views illustrating modifications.

A represents the hub of the wheel, from which a series of spokes B project, said spokes being disposed in a different plane at their outer ends than at their inner ends and to said outer ends of the spokes a hollow rim C is cast. The hollow rim is made with slots $a$ to one side of its periphery $b$,—that is to say, said slots are made in either the inner or outer face of said rim. If desired, instead of making a series of slots in the rim, one continuous slot may be made in the inner or outer face of said rim as shown in Fig. 3 and the rim may, if desired, be compressed so as to normally close said slot as shown in Fig. 4, in which latter case the rim will be elliptical in cross section.

It will be observed that by making the spokes bent, the center of the wheel will be in a different plane from the periphery and the reason for this will be made apparent farther on in this description.

In molding the wheel, the mold will be gated at the extremities of the straight portions of the spokes and said straight portions of the spokes and the hub being on a lower plane during the casting operation than the bent portions of the spokes and the rim, the center of the wheel will be cast first, and while the metal is passing upwardly in the mold to form the curved portions of the spokes and the rim, the central portion of the wheel will become somewhat chilled and set. The contraction of the heavier or central portion of the wheel being permitted to take place before the rim is formed, and the latter being made with the slots $a$, the connection of the spokes with the rim will be permanent and the separation of the spokes from the rim heretofore encountered with cast brake wheels, will be effectually avoided.

The perforations $c$ in the rim are for the reception of projections from the core to prevent the wheel turning in the mold.

Having fully described my invention, what I claim as new, and desire to secure by Letters Patent, is—

1. A brake wheel comprising a hub, spokes and a hollow rim, said rim being slotted at one side of its periphery, substantially as set forth.

2. A brake wheel comprising a hub, bent arms and a hollow rim, said rim being slotted at one side of its periphery, substantially as set forth.

3. A brake wheel made of malleable iron and comprising a hub, bent spokes and a hollow rim cast integral with each other, said hollow rim being slotted at one side of its periphery, substantially as set forth.

In testimony whereof I have signed this specification in the presence of two subscribing witnesses.

JAMES TIMMS.

Witnesses:
DUDLEY G. GRAY,
C. C. KING.